United States Patent Office 2,713,577
Patented July 19, 1955

2,713,577
PROCESS FOR ISOLATING AND PURIFYING COENZYME A

David E. Green and Helmut Beinert, Madison, Wis., assignors to Wisconsin Alumni Research Foundation, Madison, Wis., a corporation of Wisconsin No Drawing. Application December 17, 1951,
Serial No. 262,174

3 Claims. (Cl. 260—211.5)

The present invention relates to an improved process for isolating and purifying coenzyme A. More specifically the invention relates to an improved process for recovering coenzyme A from crude concentrates thereof in high yields in substantially pure form.

Coenzyme A is universally associated with all living tissues. Illustrative sources include the heart, lung, liver, kidney, and other tissues, as well as yeasts, other microorganisms, etc. Up until the discoveries leading to the present invention attempts to isolate coenzyme A from crude concentrates obtained, for example, by aqueous extraction of coenzyme A containing materials have proven impractical. Previously proposed processes have called for many tedious and involved steps and resulted in only small yields of a relatively impure product. Lipmann, F., et al., "Isolation of Coenzyme A," J. Biol. Chem. 186, 235 (1950).

The principal object of the present invention is to provide an improved, commercially practical process for obtaining coenzyme A in high yields in substantially pure form.

Another object of the present invention is to provide a simple process for removing coenzyme A from crude aqueous concentrates in a form in which coenzyme A may be readily recovered in substantially pure form.

Other objects will be apparent as the description proceeds hereinafter.

We have discovered a relatively simple method for recovering conezyme A from a crude aqueous concentrate contaminated with unwanted materials. The method involves the co-precipitation of the coenzyme A with a sulfhydryl compound from an acidified crude concentrate by means of the cuprous ion. The precipitate is free from the original contaminating materials and contains a high yield of coenzyme A present in the concentrate. It is in the form of a cuprous-coenzyme A-sulfhydryl compound complex from which the coenzyme A may be readily recovered quantitatively in the desired pure form.

The concentrates for use in the present invention may be obtained by extraction of tissues, yeast, etc. with water, removal of the insolubles by filtration, centrifugation, etc., followed by vacuum distillation at low temperatures. The impure concentrates obtained contain relatively large amounts of water soluble contaminating materials in addition to coenzyme A. If desired the concentrated aqueous extracts may be further concentrated by adsorption on charcoal followed by elution of the adsorbed coenzyme A. DeVries, W. H. et al., J. Am. Chem. Soc., 72, 4838 (1950). In practice this type of preliminary operation is generally preferred in preparing the coenzyme A concentrates. The following example will serve for illustrative purposes.

Example

About 6.2 kg. dried brewer's yeast (Anheuser Busch, strain G) in powder form was stirred into 5 volumes of water kept boiling for 5 minutes by live steam. About 4 volumes of ice were then added and the resulting mixture was centrifuged for 30 minutes to yield about 56 liters of extract. The slightly turbid supernatant was run through a column (18 cm. diam., 25 cm. high) of 900 gm. degassed charcoal (Nuchar C 190) at a flow rate of 1 liter per minute. About 16 liters of water were then passed through the column at the same flow rate. Elution was then effected by 5 per cent aqueous pyridine. After about 8 liters of the eluant had been added, the pyridine front appeared, associated with yellow-colored material. The effluent was collected from this point on. Most of the coenzyme A was eluted in the first 8 liters and elution was discontinued after 13 liters had been collected. At this point the coenzyme A content was less than 5 $\gamma$ bound pantothenic acid per cc. The eluate was freed from pyridine by shaking 3 times with a total volume of 5 liters of chloroform. The pH was adjusted to 6.5 with concentrated NaOH and the volume brought down to 2 liters. Five volumes of cold acetone were slowly added after adjustment of the pH to 2 with concentrated nitric acid. After sedimentation overnight the supernatant was syphoned off and the precipitate containing the active material was dried in vacuo after washing with acetone and ether on the centrifuge. The yield was 49 gm. of acetone powder.

About 63 gm. of acetone powder prepared as described above were dissolved in 3.2 liters of water and passed through a column containing 210 gm. of charcoal (Nuchar C 190) at a flow rate of 40 cc./minute. The column was then washed with 5 liters of dilute NaOH (pH 9.2). The column was eluted with 5 per cent pyridine. Before the pyridine front appeared, a slightly yellow eluate was obtained which contains considerable activity. The total eluate collected was 4.5 liters. After extraction with chloroform the volume was brought down to 570 cc. The total solids at this point were 29 gm. This second charcoal treatment is optional and may be eliminated although it is preferred for preparing the best product.

The impure coenzyme A concentrate obtained as described above was neutralized with concentrated NaOH. Solid glutathione was added to give a final concentration of reduced glutathione of 10–20 mg. per cc. and the pH was again adjusted to about 7 with sodium hydroxide. After 15 minutes 29 cc. of 10 N $H_2SO_4$ were added which brings the pH down to about 1. Within 1 hour a suspension of freshly prepared $Cu_2O$ was slowly added under mechanical stirring. A total of 3.4 gm. of $Cu_2O$ was used before no further precipitation was observed after centrifugation and renewed addition of $Cu_2O$. The precipitate was washed on the centrifuge 4 times with a total of 2 liters of 0.5 N $H_2SO_4$ and about 10 times with a total of 5 liters of distilled water until free of sulfate.

The washed precipitate made up of the cuprous-coenzyme A-glutathione complex was finely suspended in 400 cc. of water and decomposed with $H_2S$ overnight. The $Cu_2S$ formed during this reaction was centrifuged down and washed and the washings added to the solution from which $H_2S$ was removed in vacuo. A total of 7.8 gm. of glutathione was found in this solution by titration. The solution was diluted with water to provide a solution containing 2 mg. glutathione per cc. The pH at this state was about 3. A cation exchange column was then prepared using Dowex-50 (H+ form; 100–200 mesh) providing 1 cc. of moist resin for every 10 mg. of glutathione present. The solution was passed through this column at a flow rate of about 20 cc. per minute and washed with 1.5 liters of water. The pH of the effluent was 5.4. The effluent was concentrated in vacuo at 40–50° C. bath temperature and finally lyophilized. About 600 mg. of dry slightly yellowish substantially pure coenzyme A was obtained.

The critical step in the above process is the removal of the coenzyme A from the crude acidic concentrate as a cuprous-sulfhydryl co-precipitate. Any acid may be employed to acidify the concentrate although the use of an inorganic or mineral acid such as hydrochloric, sulfuric or like and in sufficient amounts to provide a pH of about at most 1 is preferred in the interest of high purity and good yield. Any water soluble sulfhydryl compound, e. g., amino acid type or organic type compound containing the SH group, may also be employed. Cysteine, for example, may be used in place of glutathione although the latter is preferred. In place of the cuprous oxide (or the equivalent cuprous hydroxide) any cuprous salt soluble in acidic aqueous solutions may be employed. Illustrative examples are cuprous chloride, cuprous sulfate, etc. The essential conditions for co-precipitation from the acidic coenzyme A aqueous solution are for the concentrate to contain the sulfhydryl (SH) compound plus the cuprous ($Cu^+$) ion. The coenzyme A may be recovered from the cuprous-coenzyme A-sulfhydryl compound complex by various means, although the removal of the copper with $H_2S$ as the sulfide precipitate is preferred. Also, the removal of the sulfhydryl compound by adsorption on an exchange resin as described in the example is generally preferred and in practice has proven highly satisfactory. Our investigations show the process of the present invention to be a substantial improvement over prior processes. Specifically, it provides for the first time relatively simple means for making large quantities of coenzyme A of the desired high purity.

We claim:

1. In the process of removing coenzyme A from a crude aqueous concentrate containing coenzyme A and contaminating materials, the steps which comprise adding a sulfhydryl compound to the concentrate, acidifying the concentrate, and precipitating the coenzyme A and sulfhydryl compound by addition of a compound which forms a cuprous ion in the acidic concentrate.

2. The process of claim 1 in which an aqueous suspension of the coenzyme A precipitate is treated with $H_2S$ to remove copper as the insoluble sulfide, and the resulting solution is treated with an exchange resin to remove the sulfhydryl compound.

3. In the process of purifying coenzyme A by precipitation from a crude coenzyme A concentrate, the step which consists in adding cuprous oxide to an acidified aqueous concentrate of coenzyme A containing glutathione.

References Cited in the file of this patent

UNITED STATES PATENTS

| | | |
|---|---|---|
| 2,068,623 | Warburg | Jan. 19, 1937 |
| 2,174,475 | Ostern | Sept. 26, 1939 |
| 2,250,553 | Ruskin | July 29, 1941 |
| 2,369,839 | Moore | Feb. 20, 1945 |
| 2,376,186 | Rapkine | May 15, 1945 |

OTHER REFERENCES

Lipmann et al., "Isolation of Coenzyme A," Journal of Biological Chemistry, vol. 186, 1950, pages 235–243.

Green et al., "Coenzyme Factor of Yeast," Biochemical Journal, July 1938, pages 1200 to 1203.

Advances in Enzymology, volume 14, 1953, pages 63–65.